United States Patent [19]
Oyobe et al.

[11] Patent Number: 5,799,123
[45] Date of Patent: Aug. 25, 1998

[54] DISPERSION COMPENSATING FIBER

[75] Inventors: Akira Oyobe, Yokohama; Atsushi Umeda, Ichihara, both of Japan

[73] Assignee: The Furukawa Electric Co., Ltd., Tokyo, Japan

[21] Appl. No.: 732,609

[22] Filed: Oct. 16, 1996

[30]    Foreign Application Priority Data

Oct. 20, 1995    [JP]    Japan ................... 7-272443

[51] Int. Cl.$^6$ ................................. G02B 6/02
[52] U.S. Cl. ................. 385/124; 65/385; 65/397
[58] Field of Search ...................... 385/123, 124,
              385/142, 144, 141; 65/421, 422, 30.1, 32.4,
              60.8, 426, 427, 391, 397, 412

[56]    References Cited

U.S. PATENT DOCUMENTS 4,358,181    11/1982    Gulati et al. ..................... 65/3.11

*Primary Examiner*—Akm E. Ullah
*Attorney, Agent, or Firm*—Frishauf, Holtz, Goodman, Langer & Chick

[57]    ABSTRACT

There is provided a dispersion compensating fiber comprising a center core in which a first dopant is doped substantially uniformly, an outer core provided at the outer periphery of the center core, in which the first dopant is doped so as to decrease gradually toward the outer periphery, and a clad provided at the outer periphery of the outer core, in which a second dopant is doped. The second dopant of the outer core is doped so that the viscosity on at least the outer periphery side of the outer core is substantially equal to the viscosity of the clad.

5 Claims, 3 Drawing Sheets

DISPERSION COMPENSATING FIBER

BACKGROUND OF THE INVENTION

1. Field of the Invention

The present invention relates to a dispersion compensating fiber used for a dispersion copensator, in particular, a dispersion copensator of a 1.55 μm waveband.

2. Description of Prior Art

Along with the recent technical innovations, a light amplifier of a 1.55 μm waveband using an erbium doped fiber has been used practically, and its application to the distribution systems for an optical CATV etc. and the long-distance high-capacity transmission has been receiving attention. Accordingly, a demand for performing high-speed transmission at a 1.55 μm waveband by using an existing 1.3 μm optical transmission system has increased. However, a standard 1.3 μm single mode fiber, which has a positive wavelength dispersion of about 17 ps/nm/km at a wavelength of 1.55 μm, requires a means for compensating the dispersion.

At present, a method for canceling dispersion by inserting an optical fiber having a negative wavelength dispersion which has an inverse sign of the aforesaid positive wavelength dispersion, that is, a dispersion compensating fiber into the existing 1.3 μm transmission system has been proposed as one of the most promising compensating means.

A conventional dispersion compensating fiber comprises a center core in which germanium dioxide ($GeO_2$) is doped substantially uniformly (in other words, which has a substantially uniform difference in specific refractive index), an outer core provided at the periphery of the center core, in which $GeO_2$ is doped so as to decrease gradually toward the outer periphery (in other words, whose difference in specific refractive index decreases gradually toward the outer periphery), and a clad provided at the periphery of the outer core, in which fluorine (F) is doped.

For one example of such dispersion compensating fibers, FIG. 4 shows the dopant concentration in the radial direction as a difference in specific refractive index in which the refractive index of silica glass is a reference (hereinafter referred simply to as a difference in specific refractive index), and FIG. 5 shows the distribution of difference in specific refractive index in the radial direction.

For the aforementioned dispersion compensating fiber, the center core has a difference in specific refractive index $\Delta[GeO_2]$ of +1.8%, and the clad has a difference in specific refractive index $\Delta[F]$ of −0.4%. Therefore, the difference in specific refractive index $\Delta$ between the center core and the clad is 2.2%. The difference in specific refractive index $\Delta[GeO_2]$ of the outer core is almost the same as that of the center core at the interface with the center core and almost the same as that of the clad at the interface with the clad.

It is preferable in view of an insertion space and other problems that a dispersion compensating fiber inserted into the existing 1.3 μm transmission system be as short as possible. Accordingly, the need for a dispersion compensating fiber having a large negative wavelength dispersion as per length has increased.

In general, the dispersion compensating fiber can increase the negative wavelength dispersion by increasing the difference in specific refractive index $\Delta$ between the center core and the clad. Also, the dispersion compensating fiber has an outer core in which the difference in specific refractive index decreases gradually toward the outer periphery. For this reason, the dispersion compensating fiber has no problem of the increase in structural defect loss caused when the difference in specific refractive index between the core and the clad is increased in the ordinary optical fiber.

Since the difference in specific refractive index of the outer core is decreased gradually toward the outer periphery in the aforementioned dispersion compensating fiber, however, a portion having a higher viscosity than that of the clad is produced in the outer core in the drawing process. As a result, the aforementioned dispersion compensating fiber has a disadvantage in that tensions are concentrated at that portion and residual stresses are generated so that a polarization mode dispersion is produced, and therefore it is not suitable for practical use. This polarization mode dispersion has no adverse effect when the dispersion compensating fiber is used for ordinary systems, but it is attributable to an increase in composite second order when it transmits analog picture signals for optical CATV, etc.

When the composite second order increases, there arise problems of an increase in bit error rate and generation of polarization dispersion loss (PDL). Therefore, it has been desired to develop a dispersion compensating fiber which does not produce composite second order, that is, which has no polarization mode dispersion and has a large negative wavelength dispersion with a short length.

SUMMARY OF THE INVENTION

An object of the present invention is to provide a dispersion compensating fiber which produces no polarization mode dispersion and which has a large negative wavelength dispersion with a short length.

To achieve the above object, the present invention provides a dispersion compensating fiber comprising a center core in which a first dopant is doped substantially uniformly, an outer core provided at the outer periphery of the center core, in which the first dopant is doped so as to decrease gradually toward the outer periphery, and a clad provided at the outer periphery of the outer core, in which a second dopant is doped, the second dopant of the outer core is doped so that the viscosity on at least the outer periphery side of the outer core is substantially equal to the viscosity of the clad.

Preferably, the first and second dopants are germanium dioxide and fluorine, respectively.

In the present invention, in order to avoid a problem of the increase in structural defect loss, the difference in specific refractive index between the center core and the clad, which substantially determines the magnitude of the negative wavelength dispersion, is made large, whereby the difference in specific refractive index of the outer core is gradually decreased toward the outer periphery. In this case, a portion having a higher viscosity than that of the clad is not produced in the outer core of the dispersion compensating fiber in the drawing process, so that tensions do not concentrate at this portion, and residual stresses are not generated. Therefore, the dispersion compensating fiber of the present invention, unlike the conventional dispersion compensating fiber, has no possibility of generating a polarization mode dispersion and in turn a composite second order.

The above and other objects, features, and advantages of the present invention will be more apparent in the following detailed description with reference to the accompanying drawings.

DETAILED DESCRIPTION OF THE PREFERRED EMBODIMENTS

An embodiment of the present invention will be described in detail with reference to the drawings.

Figure 1:
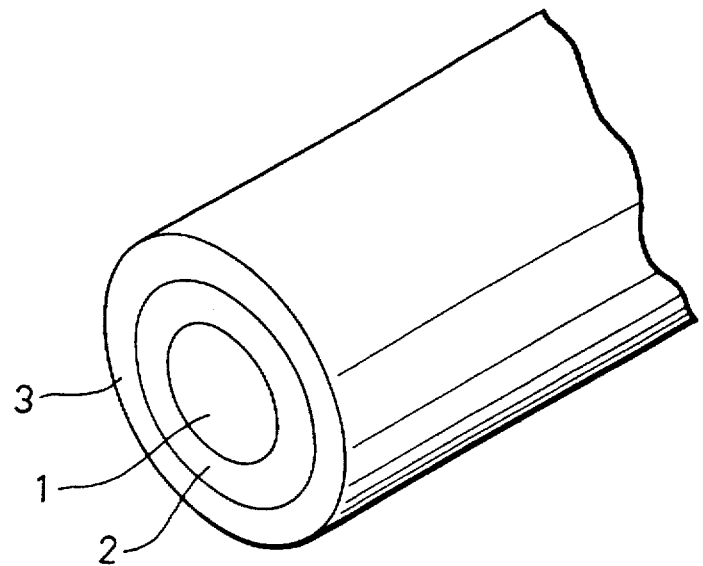
FIG. 1 is a perspective view of a dispersion compensating fiber in accordance with the present invention.

As shown in FIG. 1, a dispersion compensating fiber comprises a center core 1 which has a substantially uniform difference in specific refractive index, an outer core 2 provided at the periphery of the center core 1, whose difference in specific refractive index decreases gradually toward the outer periphery, and a clad 3 provided at the periphery of the outer core 2, in which fluorine is doped.

Figure 2:
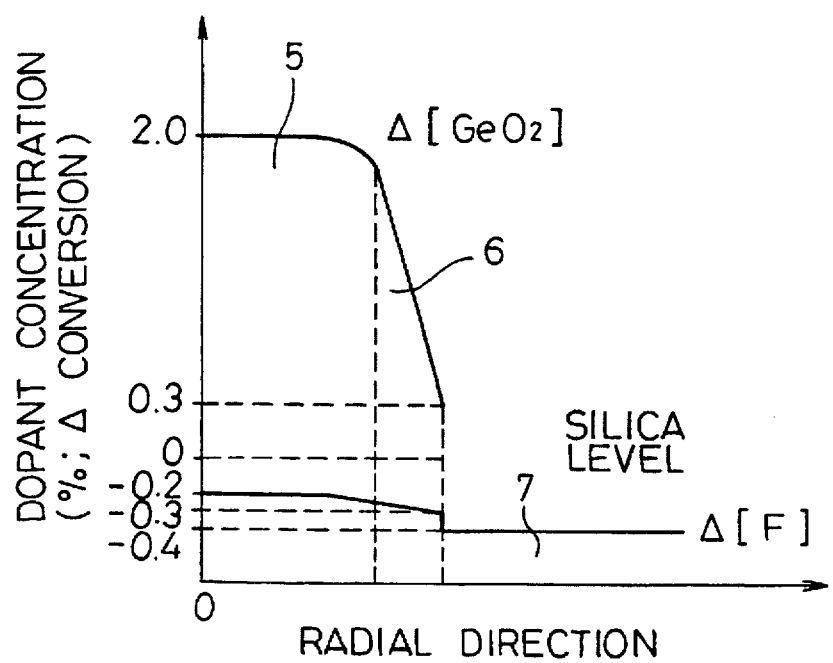
FIG. 2 is a dopant concentration distribution view showing dopant concentrations in the radial direction of the dispersion compensating fiber in accordance with the present invention as a difference in specific refractive index in which the refractive index of silica glass is the reference.
Figure 3:
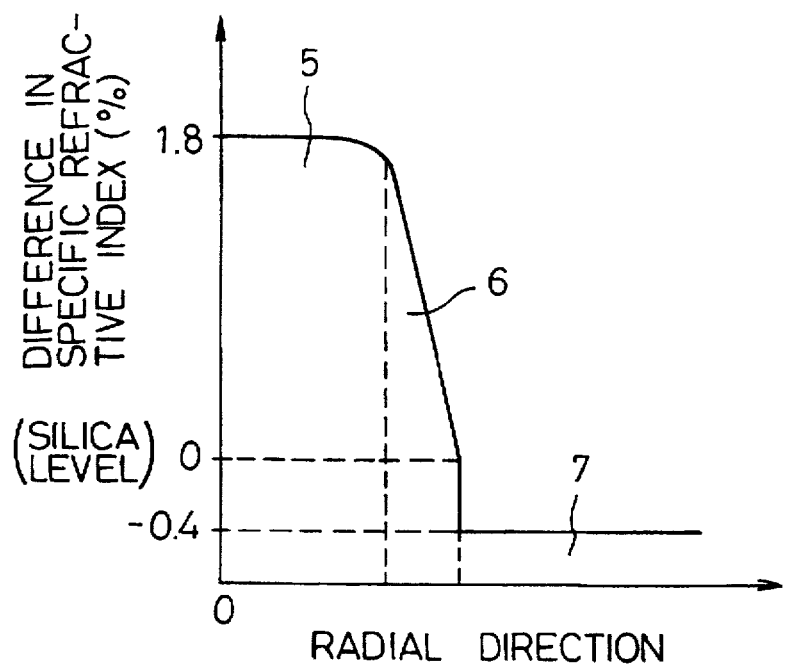
FIG. 3 is a distribution view for difference in specific refractive index showing differences in specific refractive index in the radial direction of the dispersion compensating fiber in accordance with the present invention.

The dispersion compensating fiber has a dopant concentration and difference in specific refractive index shown in FIGS. 2 and 3, respectively, in the radial direction. FIG. 2 shows dopant concentrations in the radial direction as a difference in specific refractive index in which the refractive index of silica glass is the reference, and FIG. 3 shows differences in specific refractive index in the radial direction. In the figures, reference numeral 5 denotes a portion corresponding to the center core 1, 6 denotes a portion corresponding to the outer core 2, and 7 denotes a portion corresponding to the clad 3. These are true in FIGS. 4 and 5 as well.

The aforementioned dispersion compensating fiber was manufactured in the following way. First, a $GeO_2$ doped silica porous base material, which constitutes the center core and the outer core, was manufactured by the VAD method. It is so far known that the dope amount of fluorine changes depending on the soot density when the silica porous base material is sintered in the $SiF_4$ atmosphere. In manufacturing the silica porous base material, therefore, control was carried out so that the soot density at the portion corresponding to the outer core decreases toward the outside in the radial direction by controlling the burner position, oxygen gas quantity, hydrogen gas quantity, etc. By dehydrating and sintering the porous base material thus manufactured under the conditions given in Table 1, a core rod in which an outer core is formed outside a center core was obtained.

TABLE 1

| | Atmosphere | Temp. | Insertion speed |
|---|---|---|---|
| Dehydration | He gas to which 2 vol % $Cl_2$ is added | 1000° C. | 4 mm/min |
| Sintering | He gas to which 4 vol % $SiF_4$ and 1 vol % $Cl_2$ is added | 1400° C. | 4 mm/min |

Next, the core rod was extended into an outside diameter of 12 mm, and hydrofluoric acid etching was applied to the surface thereof. After that, a clad consisting of fluorine doped silica glass of $\Delta[F]=-0.4\%$ was formed at the periphery by the externally attaching method to manufacture a porous base material for optical fiber. By dehydrating and sintering the porous base material for optical fiber under the conditions given in Table 2, an optical fiber base material was obtained.

TABLE 2

| | Atmosphere | Temp. | Insertion speed |
|---|---|---|---|
| Dehydration | He gas to which 2 vol % $Cl_2$ is added | 1000° C. | 4 mm/min |
| Sintering | He gas to which 12.7 vol % $SiF_4$ is added | 1400° C. | 4 mm/min |

The resultant optical fiber base material has a difference in specific refractive index distribution as shown in FIG. 3. The dopant concentration is as shown in FIG. 2. As seen from the figure, the dopant concentration $\Delta[GeO_2]$ of the center core 1 is +2.0%, the dopant concentration $\Delta[F]$ of the clad 3 is -0.4%, the dopant concentration $\Delta[GeO_2]$ at the outer periphery of the outer core 2 is +0.3%, and the dopant concentration $\Delta[F]$ at the inner periphery of the clad 3 is -0.3%. It is found that both of $GeO_2$ and F reduce the viscosity of silica glass. If $GeO_2$ and F are doped so that the differences in specific refractive index at the outer periphery of the outer core 2 and the inner periphery of the clad 3 ensures the relationship of $\Delta[GeO_2]/\Delta[F]=-3$, the viscosity of the outer core 2 and clad 3 becomes equal in the drawing process of optical fiber. That is to say, if the equal amounts of $GeO_2$ and F in difference in specific refractive index are added to silica glass, F reduces the viscosity of silica glass by a factor of three over $GeO_2$. The contributions of $GeO_2$ and F to the difference in specific refractive index in each core, $\Delta[GeO_2]$ and $\Delta[F]$, were determined by comparing the difference in specific refractive index distribution of an optical fiber material obtained by sintering, in an atmosphere containing no $SiF_4$, the porous base material for optical fiber manufactured under the same conditions as those described above.

A dispersion compensating fiber was drawn from the optical fiber base material thus manufactured, and a coating layer of ultraviolet curing type resin was immediately applied. Thus, three dispersion compensating fibers with an outer core diameter of 2.5 μm, a clad diameter of 125 μm, a coating diameter of 240 μm, and a length of about 10 km were manufactured. The polarization mode dispersions of the manufactured dispersion compensating fibers were measured by the Jones matrix method, with the result of 0.089 ps/km$^{-\frac{1}{2}}$, 0.123 ps/km$^{-\frac{1}{2}}$, and 0.108 ps/km$^{-\frac{1}{2}}$, all of them being approximately 0.1 ps/km$^{-\frac{1}{2}}$. These values are equivalent to the polarization mode dispersion (0.099 ps/km$^{-\frac{1}{2}}$) of a standard 1.3 μm single mode fiber.

Figure 4:
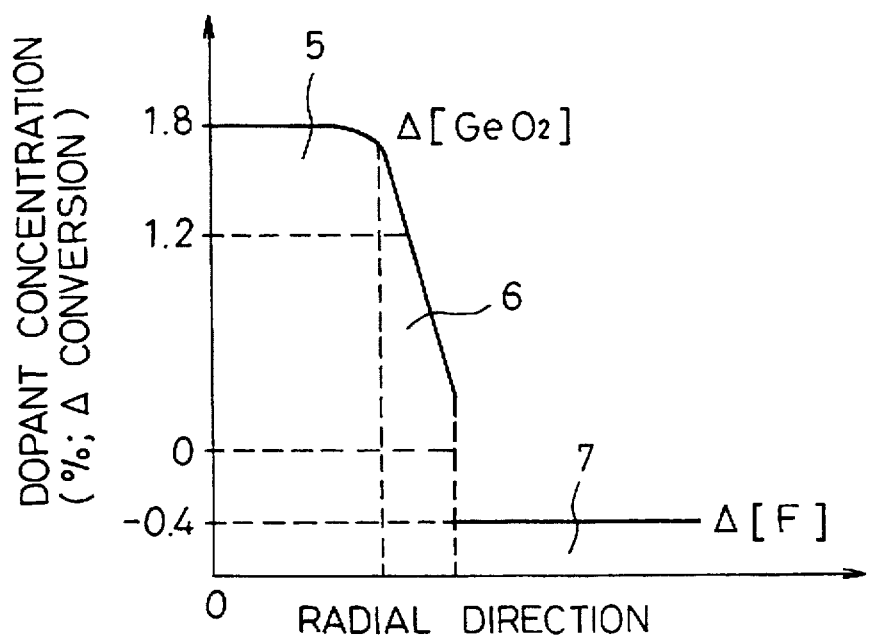
FIG. 4 is a dopant concentration distribution view showing dopant concentrations in the radial direction of the dispersion compensating fiber in accordance with the comparative example as a difference in specific refractive index in which the refractive index of silica glass is the reference.
Figure 5:
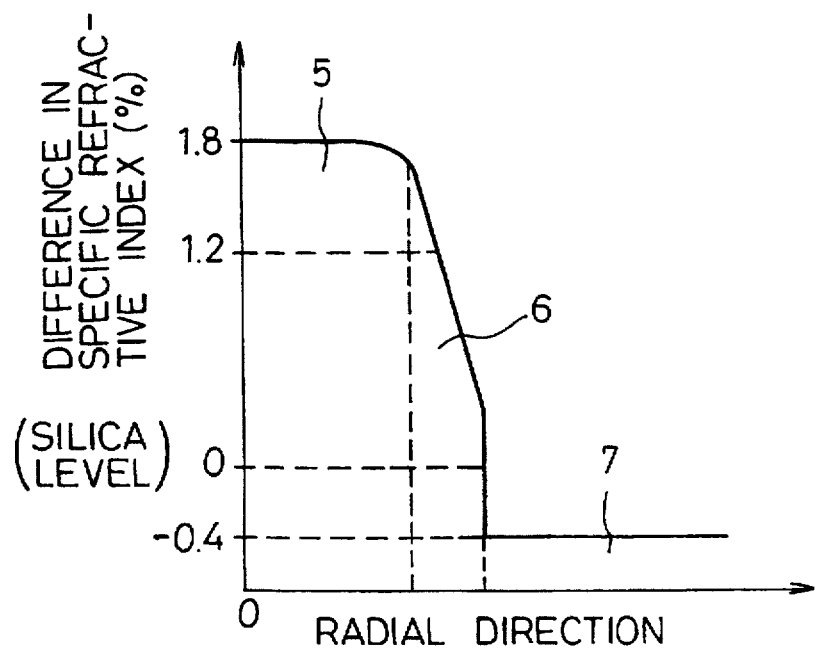
FIG. 5 is a distribution view for difference in specific refractive index showing differences in specific refractive index in the radial direction of the dispersion compensating fiber in accordance with the comparative example.

As a comparative example, three conventional dispersion compensating fibers were manufactured, which comprises a center core portion 5 in which $GeO_2$ is doped substantially uniformly in the radial direction, an outer core portion 6 provided at the outer periphery of the center core portion 5, in which $GeO_2$ is doped so as to decrease gradually toward the outer periphery, and a clad portion 7 provided at the outer periphery of the outer core portion 6, in which fluorine is doped, as shown in FIG. 4. The difference in specific refractive index $\Delta[GeO_2]$ of the center core portion 5 was +1.8%, and the difference in specific refractive index $\Delta[F]$ of the clad portion 7 was -0.4%. Therefore, the difference in specific refractive index $\Delta$ between these portions 5 and 7 was 2.2%. The distribution of difference in specific refractive index was as shown in FIG. 5, which is almost the same as the distribution of difference in specific refractive index of the dispersion compensating fiber manufactured in the working example shown in FIG. 3.

The polarization mode dispersions of the dispersion compensating fibers thus obtained were measured by the Jones matrix method, with the result of 0.790 ps/km$^{-1/2}$, 0.420 ps/km$^{-1/2}$, and 0.334 ps/km$^{-1/2}$. These values were considerably larger than the polarization mode dispersion (0.099 ps/km$^{-1/2}$) of a standard 1.3 μm single mode fiber.

What is claimed is:

1. A dispersion compensating fiber comprising, a center core in which a first dopant is doped substantially uniformly, an outer core provided at an outer periphery of said center core, said first dopant being doped in said outer core so as to decrease gradually toward an outer periphery of said outer core, and a clad provided at the outer periphery of said outer core, said clad being doped with a second dopant, wherein said outer core is also doped with said second dopant so that a viscosity on at least the outer periphery of said outer core is substantially equal to a viscosity of said clad.

2. A dispersion compensating fiber according to claim 1, wherein said first dopant is germanium dioxide.

3. A dispersion compensating fiber according to claim 1, wherein said second dopant is fluorine.

4. A dispersion fiber according to claim 1, wherein said first dopant is germanium dioxide and said second dopant is fluorine, and wherein a dopant concentration $\Delta\{GeO_2\}$ of the center core is +2%, a dopant concentration $\Delta\{F\}$ of the clad is −0.4%, a dopant concentration $\Delta\{GeO_2\}$ at the outer periphery of the outer core is +0.3%, a dopant concentration $\Delta\{F\}$ at an inner periphery of the clad is −0.3%.

5. A dispersion compensating fiber according to claim 2, wherein said second dopant is fluorine.

* * * * *